United States Patent [19]
Cotton et al.

[11] 4,048,942
[45] Sept. 20, 1977

[54] HELICOPTER TOWLINE RECOVERY BUOY SYSTEM

[75] Inventors: Charles C. Cotton; Guy S. D. Jencks, both of Panama City, Fla.

[73] Assignee: The United States of America as represented by the Secretary of the Navy, Washington, D.C.

[21] Appl. No.: 770,732

[22] Filed: Feb. 22, 1977

[51] Int. Cl.² .............................................. B63B 21/56
[52] U.S. Cl. .................................... 114/253; 9/8 R; 244/137 R; 244/138 R
[58] Field of Search ............... 9/8 R, 9; 114/244, 245, 114/253, 254; 244/1 TD, 138 R, 137 R; 116/26, 107, DIG. 8, 124 R, 124 B; 273/105.3

[56] References Cited
U.S. PATENT DOCUMENTS

| | | | |
|---|---|---|---|
| 2,534,716 | 12/1950 | Hudspeth et al. | 9/8 R |
| 2,783,731 | 3/1957 | Wilhelm | 9/9 X |
| 2,903,717 | 9/1959 | Vintschger | 9/9 |
| 3,157,890 | 11/1964 | Mellon, Jr. et al. | 9/9 |
| 3,296,995 | 1/1967 | Van der Linde | 114/244 |
| 3,866,561 | 2/1975 | Sieber | 114/254 |

*Primary Examiner*—Trygve M. Blix
*Assistant Examiner*—Sherman D. Basinger
*Attorney, Agent, or Firm*—Richard S. Sciascia; Harvey A. David

[57] ABSTRACT

A helicopter carried, towline recovery buoy system including a package containing a retrieval line, inflatable buoys, and buoy inflating devices. A support and release mechanism releases the package response to dropping of the towline. The buoys and retrieval line are automatically deployed to permit recovery of the towline by grappling from a helicopter.

11 Claims, 6 Drawing Figures

HELICOPTER TOWLINE RECOVERY BUOY SYSTEM

BACKGROUND OF THE INVENTION

This invention relates to a buoy system for aiding in the recovery of a towline used in the towing of apparatus on, in, or over water by a helicopter.

Helicopters are used by the military to tow various apparatus, for example airborne mine countermeasure devices designed to explode or otherwise neutralize underwater mines. The apparatus is towed by means of a cable or towline having a towball or other releasable connecting element at the proximal end thereof. The towline can thereby be quickly released from the towing helicopter if jettisoning is desired or made necessary by various operating conditons. Heretofore, the recovery of the towline and associated apparatus, jettisoned either inadvertently or intentionally, has required the assitance of a surface vessel. Of course that is a costly, time consuming, and in many instances impractical solution.

SUMMARY OF THE INVENTION

The present invention aims to provide a more acceptable and practical solution to the problem of recovering from the water a towline that has been dropped from a towing helicopter.

With the foregoing in mind it is a principal object of this invention to provide a towline recovery buoy system that is automatic in operation and makes it practical for a helicopter to recover its own towline from the water.

Another object of the invention is the provision of a recovery buoy system that is adapted to be carried by the towing helicopter and which is automatically deployed to buoy up and mark the location of a dropped towline, and to provide a retrieving line assembly that is easily picked up by a grappling hook from the helicopter.

Yet another object is the provision of a recovery buoy system of the foregoing character comprising a novel support and release mechanism for attaching a system package to the helicopter and for automatically releasing the package in response to dropping of the towline.

Still another object is the provision of an improved buoy system package including water actuated, inflatable buoy means.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figure 1:
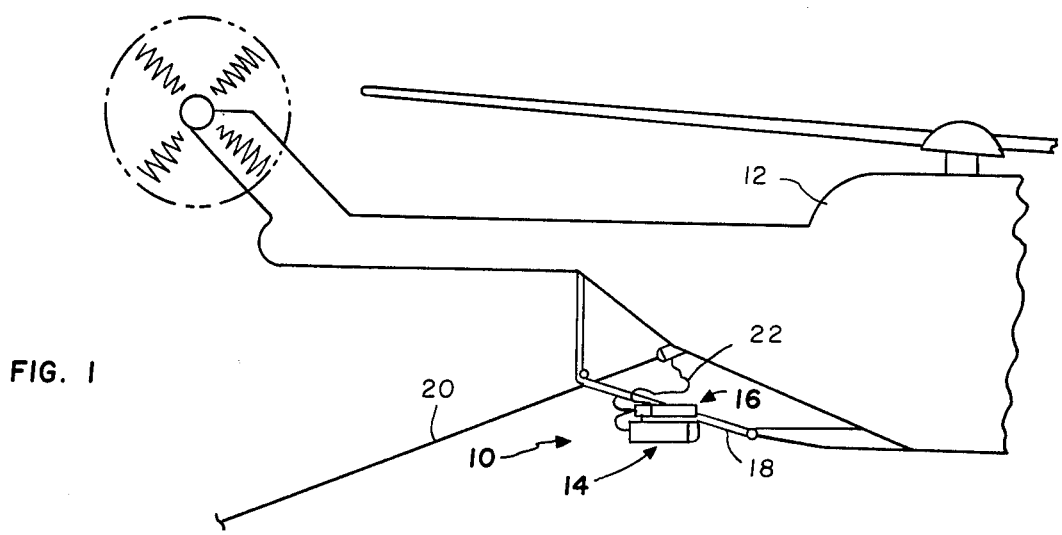
FIG. 1 is a side elevational view of a recovery buoy system embodying the present invention and shown in its packaged state of readiness in association with a towing helicopter.

In the form of the invention illustrated in the drawings and described hereinafter, and with reference first to FIG. 1, a recovery buoy system is indicated generally at 10 in association with a towing helicopter 12. The system 10 comprises a buoy and retrieval line package 14 that is releasably attached to the helicopter 12 by a support and release mechanism 16 mounted on a tubular helicopter strut 18. A towline 20 has its proximal end attached to the helicopter, and is connected by a release pendant 22 to the support and release mechanism 16 and to the package 14.

Figure 2:
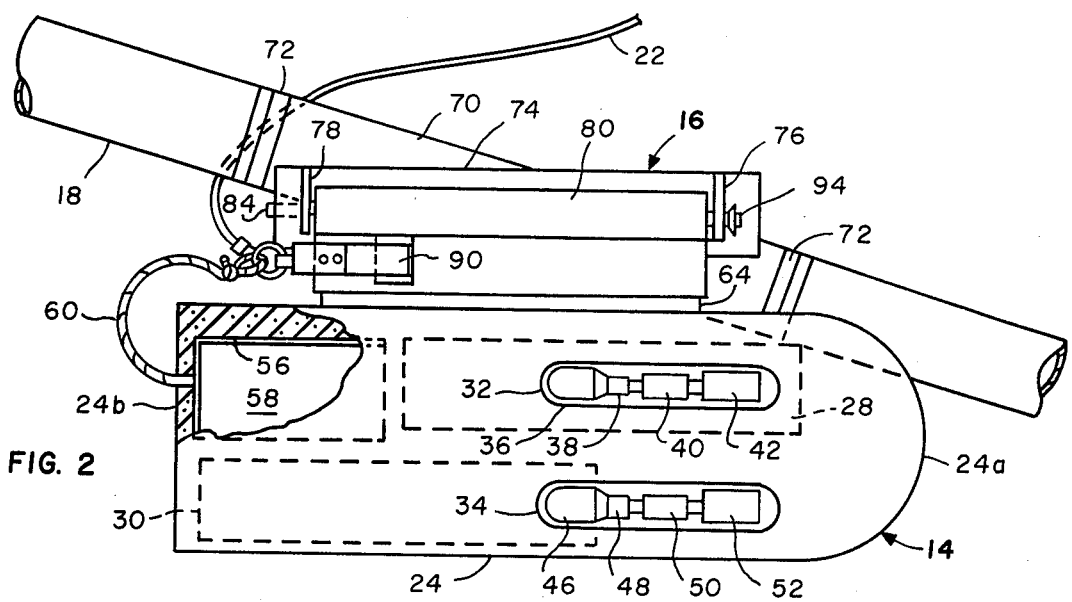
FIG. 2 is an enlarged elevational view of the buoy system of FIG. 1, with a portion broken away to reveal other portions.
Figure 3:
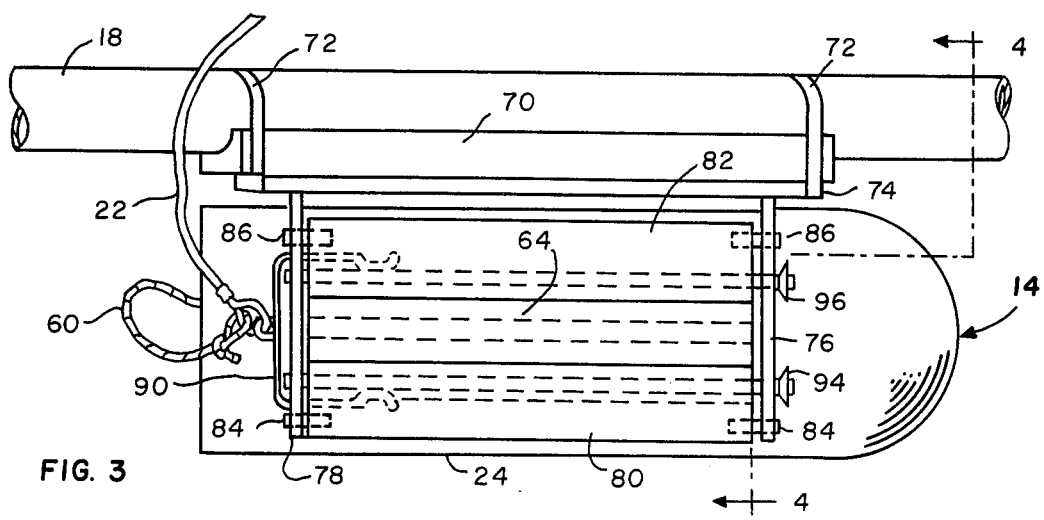
FIG. 3 is a plan view of the system.
Figure 4:
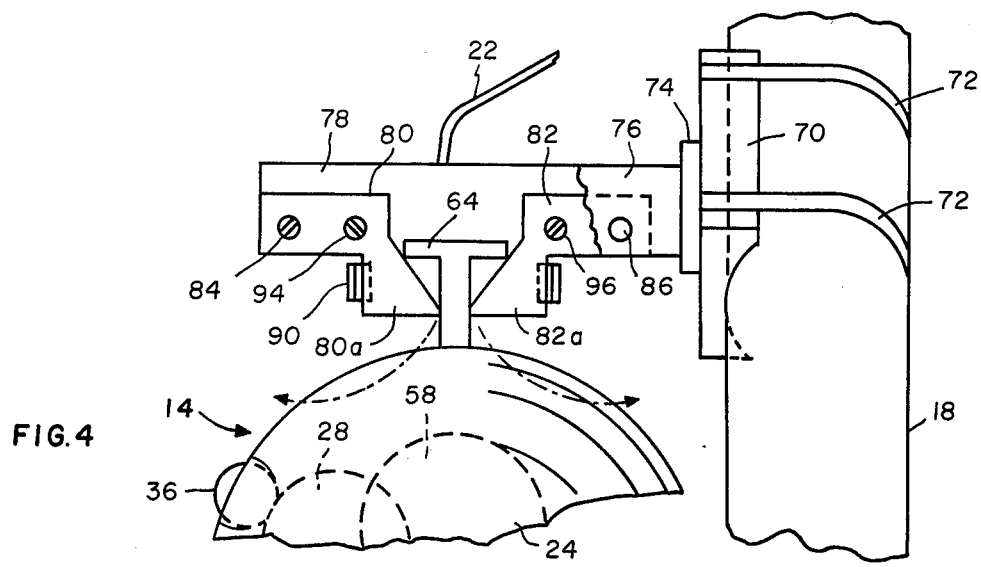
FIG. 4 is an end view of the system, with portions broken away.

Referring now to FIGS. 2, 3 and 4, the package 14 comprises a generally cylindrical body 24 formed of polystyrene foam plastic material that is light, strong, impact resistant, yet readily frangible. The material is conveniently of a type well known for use as flotation material sold under the name STYROFOAM. The body 24 is provided with a nose portion 24a that is rounded or otherwise streamlined to minimize air flow resistance.

Housed within cavities in the body 24 are first and second inflatable buoys 28 and 30. These buoys are in a normally deflated or furled condition.

Retained in first and second recesses 32 and 34 in the side wall of the body 24 are mechanisms for effecting rapid inflation of the buoys 28 and 30 in the event the package 14 falls into water. Thus, in recess 32, a compressed gas containing flask in the form of a $CO_2$ cartridge 36 is connected by a connector 38 to the buoy 28 and to an electrically actuable explosive driver 40. The driver 40, which is conveniently of the type known in the U.S. military as a MK 21 explosive driver, is connected to a battery and water acticated switch packet 42. This packet will later be described in more detail with reference to FIG. 5. Similarly, the recess 34 contains a $CO_2$ cartridge 46, connector 48, driver 50, and switch and battery packet 52.

Housed in a third cavity 56 in body 24 is a coil 58 of retrieving line 60. The end portion of the retrieving line 60 extends from the center of the coil 58, through an opening in the end wall 24b of the package body, and is connected to the actuating pendant 22. The opposite end of retrieving line 60, which is conveniently 300 feet of 3/16 inch nylon line, is connected to one of the inflatable buoys. A 25 foot length of floating polyethylene line 62 (FIG. 6) interconnects the buoys 28 and 30.

Extending upwardly from the body 24 of package 14 is an attachment member 64. This member, which runs fore and aft, has its lower portion embedded in the body 24 where it serves as a backbone for the package 14 while the exposed portion is T-shaped in section and is adapted to cooperate with the support and release mechanism 16, about to be described.

The mechanism 16 comprises a metal base member 70 that is secured by clamps or bands 72 to the strut 18. Fixed to the base member 70, as by welding, is an elongated bar 74 that extends generally horizontally, in a fore and aft direction relative to helicopter 12. Extending in horizontally spaced, parallel relation from the bar 74 are a pair of horizontal arms 76,78. The member 70, bar 74, and arms 76,78 comprise a frame or support means.

Hingedly or pivotally disposed between the arms 76,78 are a pair of attachment member grippers 80 and 82. The grippers 80 and 82 are adapted to swing about laterally spaced, parallel fore and aft axes defined by hinge pins 84 and 86, respectively, and have claw portions 80a and 82a that engage and retain the T-shaped attachment member 64 when the grippers are in a closed position as illustrated.

A U-shaped locking clamp 90 has resilient leg portions that straddle the claw portions 80a, 80b and serve to hold the grippers in their illustrated closed positions on the attachment member 64. The bight of the locking clamp 90 has an eye to which the bitter end of the release pendant 22 is fixed. The outer end of the retrieving line 60 is conveniently secured to that end of the release pendant 22 adjacent the connection of the latter to the locking clamp 90. The locking clamp leg portions are advantageously bent near the ends thereof to form retaining nibs that engage in corresponding recesses in the sides of the claw portions of the grippers 80,82 so that a predetermined minimum pulling force is required to remove the clamp 90.

A pair of removable safety pins 94, 96 are provided that extend through arms 76, 78 and through the grippers 80 and 82 therebetween. The safety pins serve to positively hold the grippers in closed condition at all times that it is desired that opening of the grippers be precluded. The safety pins 94,96 are readily withdrawn when the system is to be made operational, leaving only the locking clamp 90 to hold the grippers 80,82 closed on the attachment member 64 of the package 14.

Figure 5:
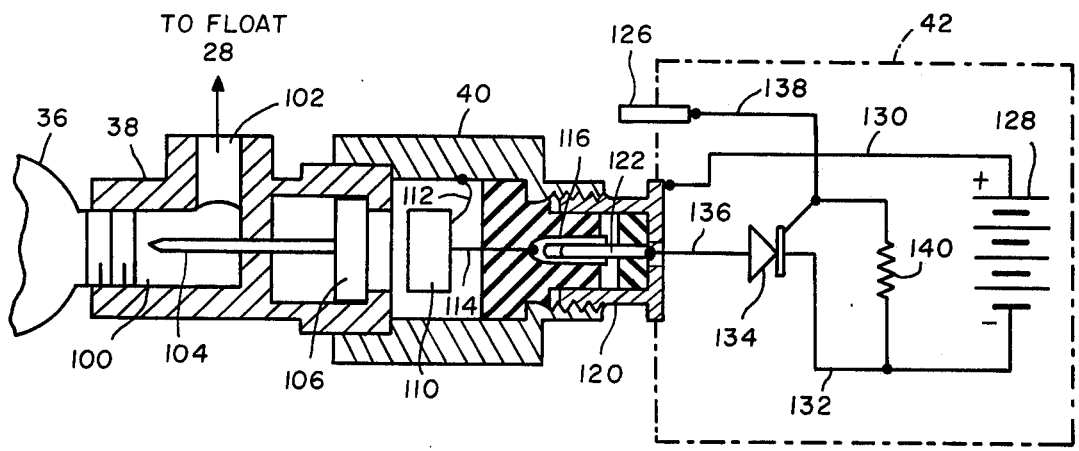
FIG. 5 is a view partly in section and partly diagrammatic, illustrating buoy inflating mechanisms and circuitry.

Referring now to FIG. 5, the connector 38 is seen to comprise a body that defines a flow passage 100 leading from the nozzle of cartridge 36 to an outlet port 102. Port 102 is connected to the inflatable float 28. A cartridge seal piercing needle 104 is carried by a plunger 106 operable in a bore of the connector body.

The explosive driver 40 comprises a metal body sleeved over the plunger end of the connector 38 and houses an electrically ignitable squib or charge 110. Charge 110 has one electrical lead 112 connected to the driver body and the other lead 114 connected to the tubular center terminal 116 of an electrical connector formed at the end of the driver body opposite the connector 38.

The water activated switch and battery packet 42 comprises a complementary electrical connector including an external portion or element 120 threaded into the driver body and a central pin or terminal 122 engaging terminal 116. A third terminal or electrode 126 is disposed in predetermined closely spaced relation to the connector element 120 and cooperates therewith as a water sensing electrode pair.

Included in the packet 42 is a voltage source in the form of a battery 128 having its positive terminal connected, as by conductor 130, to the connector element 120. The negative terminal of the battery 128 is connected by conductor 132 to the cathode of a silicon controlled rectifier or SCR 134. The anode of the SCR is connected to the connector pin 122 by conductor 136, and the gate connection of the SCR is connected by conductor 138 to the electrode 126. A biasing resistor 140 is connected between the gate and the cathode to negative voltage battery connection to complete a water sensitive electronic switch circuit that includes the charge 110 as the load. The packet 52 is identical to the packet 42 and so further description thereof will not be made.

MODE OF OPERATION

Figure 6:
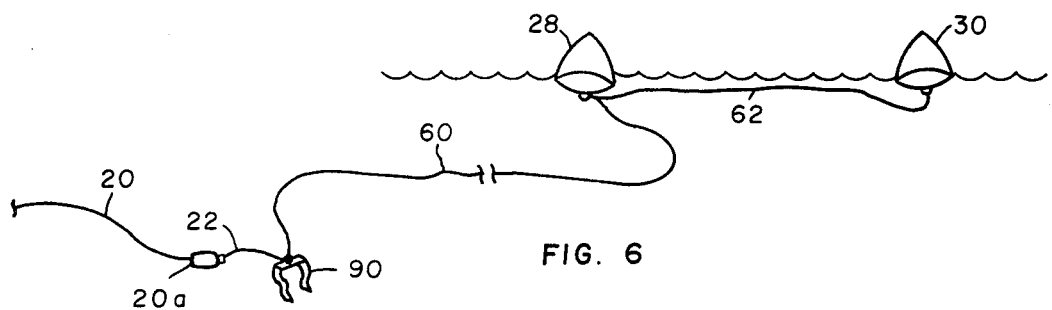
FIG. 6 is a view illustrating deployment of the retrieval line and buoys of the system.

Consider the system 10 to be in place on a towing helicopter as illustrated in FIG. 1, with the safety pins 84,86 removed. Now, if the tow cable 20 becomes released from the helicopter, pendant 22 that is connected between the cable end fitting 20a (FIG. 6) and the clamp 90 will pull that clamp from the grippers 80,82 of the support and release mechanism 16. This will permit the grippers to pivot downwardly, release the attachment member 64, and allow the buoy and retrieving line package 14 to fall away from the helicopter. As the package 14 falls toward the water, the recoil of the jettisoned gear is absorbed by stripping of the retrieving line 60 from the center of the coil 58 thereof in the styrofoam body 24. When the package 14 lands in the water, and the electrode pairs 120,126 are bridged, the electronic switches in packets 42 and 52 will fire their respective explosive drivers 40 and 50. The inflatable floats 28 and 30 will thereupon be forcefully inflated from the respective $CO_2$ cartridges. The rapid inflation of the buoys will shatter the plastic foam body 24 of package 14, permitting completion of the retrieval line pay out and separation of the two buoys tethered by the polyethylene line 62 therebetween as illustrated in FIG. 6. With the buoys 28,30, the retrieval line 60, and the tether line 62 so deployed, retrieval of the towline 20 by grappling from the helicopter for the floating tether between the buoys becomes an easy matter.

While the foregoing description is of a presently preferred exemplary embodiment, the invention contemplates that various alternative constructions are within the scope thereof. For example, a mechanical buoy inflation triggering means can be substituted for the water activated switch and explosive driver combination.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. A towline recovery system for use with a helicopter equipped with a droppable towline, said system comprising:
    a retrieval line and float package comprising a housing, an attachment member on said housing, a retrieval line coiled in said housing and having a first end portion extending therefrom and connected to said towline, inflatable float means disposed in said housing and connected to a second end portion of said retrieval line, and means for inflating said float means; and
    attachment and release means, mounted on said helicopter and cooperable with said attachment member, for securing said package to said helicopter and for releasing said package in response to dropping of said towline.

2. A towline recovery system as defined in claim 1, and wherein said means for inflating said float means comprises:
    a source of inflating gas;
    means connected between said source and said float for introducing said gas into said float means; and condition responsive means, for initiating inflation of said float means in response to a predetermined condition resulting from dropping of said towline.

3. A towline recovery system as defined in claim 2, and wherein said attachment and release means comprises:
   support means adapted to be mounted on said helicopter;
   first and second gripper members pivoted to said support means for swinging movement about first and second spaced parallel axes, respectively;
   said gripper members being cooperable with said attachment member and being movable from first operative positions, in which said package is secured, to second operative positions, in which said package is released;
   removable clamp means for holding said gripper members in said first operative positions; and
   pendant means, connected between said towline and said clamp means, for pulling said clamp means from holding relation to said gripper means so as to release said package.

4. A towline recovery system as defined in claim 1, and wherein said attachment and release means comprises:
   support means adapted to be mounted on said helicopter; first and second gripper members pivoted to said support means for swinging movement about first and second spaced parallel axes, respectively;
   said gripper members being cooperable with said attachment member and being movable from first operative positions, in which said package is secured, to second operative positions, in which said package is released;
   removable clamp means for holding said gripper members in said first operative positions; and
   pendant means, connected between said towline and said clamp means, for pulling said clamp means from holding relation to said gripper members so as to release said package.

5. A towline recovery system as defined in claim 1, and wherein:
   said float means comprises first and second inflatable floats and a tether line of predetermined length interconnecting said floats; and
   said means for inflating said float means comprises first and second sources of inflating gas, first and second connecting means for introducing said gas from said first and second sources into said first and second floats, respectively, and first and second condition responsive means for initiating inflation of said float means in response to a predetermined condition resulting from dropping of said towline.

6. A towline recovery system as defined in claim 1, and wherein:
   said housing means comprises a body of frangible material;
   said body defining at least a first cavity in which said inflatable float means is disposed in furled condition;
   whereby inflation of said float means will shatter said body so as to free said float means from said body to mark the location of said retrieval line and position said line for each in grappling.

7. A towline recovery system as defined in claim 6, and wherein:
   said frangible material comprises a foamed plastic;
   said float means comprises first and second inflatable floats interconnected by a tether line;
   said body defines a plurality of cavities in which said first and second floats and said coiled retrieval line are individually disposed.

8. A towline recovery system for use in combination with a helicopter equipped with a towline having a proximal end that is adapted to be disconnected and dropped from the helicopter, said system comprising:
   a retrieval line and float package comprising a frangible housing, a retrieval line disposed in said housing and adapted to pay out therefrom, a plurality of inflatable floats disposed in furled condition in said housing and connected to one end of said retrieval line, and inflating means for inflating said floats in response to a predetermined condition, said package having a T-shaped attachment member extending upwardly therefrom;
   an attachment and release mechanism mounted on said helicopter and comprising a frame having a pair of horizontally spaced, parallel frame members, a pair of gripper members pivotally mounted between said frame members for swinging movement about horizontally spaced, parallel axes, said gripper members each having a claw portion engaging said T-shaped attachment member, removable clamp means holding said gripper members in gripping relation to said attachment member; and
   pendant means connecting said clamp means and the other end of said retrieval line to said proximal end of said towline, whereby dropping of said towline will cause said pendant to remove said clamp means so that said gripper members will release said attachment member and allow said package to fall free for deployment of said retrieval line and said floats.

9. A towline recovery system as defined in claim 8, and wherein said inflating means is responsive to immersion in water to effect inflation of said floats.

10. A towline recovery system as defined in claim 8, and further comprising:
    removable safety pin means, extending through said frame members and said gripper members, for precluding untimely release of said package.

11. A towline recovery system as defined in claim 8, and wherein said inflating means comprises:
    a $CO_2$ cartridge having a rupturable seal;
    connector means, including a seal rupturing member, for directing gas flow into an inflatable float;
    electrically ignitable expolsive driver means for actuating said rupturing member; and
    a water responsive electronic switch circuit for igniting said charge in response to immersion.

* * * * *